Patented Nov. 25, 1952

2,619,475

UNITED STATES PATENT OFFICE 2,619,475

BONDED GLASS FIBER STRUCTURES AND METHOD AND COMPOSITION FOR USE IN MANUFACTURING COMPOSITIONS

Louis A. Kovreg, Huntingdon, Pa., assignor to Owens-Corning Fiberglas Corporation, a corporation of Delaware No Drawing. Application August 30, 1951, Serial No. 244,467

8 Claims. (Cl. 260—17.4)

This invention relates to the manufacture of bonded mineral wool products and to methods and materials for use in same and it relates more particularly to an improved binder composition for use in the fabrication of bonded fibrous structures preferably embodying glass wool fibers in the manufacture of substantially porous panels capable of use for heat and sound insulation and the like, and for the manufacture of bonded mat capable of use as battery separators and the like.

An object of this invention is to produce and to provide a method for producing an improved porous bat or mat of bonded mineral wool fibers and it is a related object to provide a new and improved furfuryl alcohol type binder composition for use in the manufacture of same.

Furfuryl alcohol reacted in aqueous medium at elevated temperatures and in the presence of acids or other catalyst has been applied as a binder composition to glass fibers but the resulting products have been characterized by an undesirable degree of brashiness and brittleness and the bonded structures have been relatively weak and incapable of standing up properly when exposed to atmospheric conditions. It is believed that the presence of higher concentrations of resin on the glass fiber surfaces might produce a stronger and less brashy bonded structure but it has been difficult expediently to deposit larger amounts because instability has resulted when the concentration of the furfuryl alcohol in the polymerization mixture exceeded 15-20 percent by weight.

Another objectionable feature of furfuryl alcohol resinous binders which have heretofore been produced resides, as previously pointed out, in their poor weathering properties. When exposed to weathering for a few days, it appears that very little of the furfuryl alcohol binder remains in position to secure the fibers together in a fibrous structure and that which does remain is more brittle and weak.

Therefore, it is another object to provide a furfuryl alcohol binder composition which may be prepared in concentrations higher than that which has heretofore been considered possible and to apply therefrom a higher concentration of resinous material in the bonded mineral wool structure and it is a related object to produce a new and improved mineral wool product prepared therefrom.

A further object is to provide a furfuryl alcohol binder composition which is stable and which when applied to the fibers and cured, deposits a resinous material which is characterized by good weathering resistance to produce a strong, durable bonded structure having less brashiness than in corresponding structures which have heretofore been produced.

Basically the conditions of reaction for furfuryl alcohol by polymerization in aqueous medium correspond to that which has previously been employed and is substantially described in the patent to White and Smucker, No. 2,397,497, the teachings of which are incorporated herein by reference. As described in the above mentioned patent, the furfuryl alcohol is taken into solution in water and polymerized in the presence of an acidic catalyst such as a mineral acid of the type hydrochloric acid, sulphuric acid or a solution of sulphuric acid and butyl alcohol, or an acid forming salt such as ferric chloride, tin chloride, ammonium chloride, ammonium phosphate or the like. The latter compounds having portions capable of volatilization or precipitation to produce acids offer a type of catalyst which has limited reaction under normal conditions so as to limit inadvertent polymerization until heated up to reaction conditions whereby the acids are released for catalyzing the polymerization. Such latent acting catalysts may be incorporated initially into the solution of furfuryl alcohol and water but it is often preferred, where greater stability or shelf life is desired, to use only so much catalyst as will provide for the initial polymerization and then add the latent type acid forming salt prior to use for catalyzing the resin formation in position of use. The amount of catalyst which may be used generally ranges from 1-5 percent by weight based upon the amount of furfuryl alcohol.

As previously pointed out, the furfural alcohol is initially water soluble but when polymerization takes place the resinous material which forms becomes less soluble in water and it therefore has been necessary to incorporate a certain amount of an emulsifying agent so as to effect a dispersion of the resinous particles upon formation. For this purpose, use has been made of starch, gelatin and the like, alone or in combination with anionic or cationic emulsifying agents of the type described in the White and Smucker Patent No. 2,397,497.

With such emulsifying agents as gelatin and starch, with or without additional cationic or anionic emulsifying compounds, it is difficult to produce emulsions having more than 15-20 percent by weight furfuryl alcohol because otherwise instability and precipitation will take place. This limits the amount of solids which can be deposited on the glass fibers as a binder and the amount which has heretofore been deposited has been found to be insufficient to produce the strengths desired and reduce brashiness. In systems of the type heretofore employed, such as described in the White and Smucker patent supra, reaction to polymerize the furfuryl alcohol in the presence of an acidic catalyst has been limited to a relatively short period, such as 15 minutes, and it is difficult under such reaction conditions to control the type of polymerization such that a wide variety of polymers are produced, or to effect polymerization in a manner to cause the build-up of large molecules capable of satisfactorily resisting deterioration or solution under conditions of use. As a result, the resinous binder deposited from the dispersions of furfuryl alcohol polymerized in aqueous medium has been incapable of optimum use in fabrics exposed to weathering wherein a large portion of the binder appears to be eliminated within a few days or weeks.

It is an object of this invention to overcome the difficulties heretofore encountered in the emulsion polymerization of furfuryl alcohol and to produce a glass fiber binder composition of the type described having relatively high solids content and molecules composed of a considerably larger number of building units and to produce a new and improved bonded glass fiber fabric thereof characterized by a greater concentration of resin to increase strength while reducing the brashiness of the fabric and the ability of the resin to stand up well under conditions of use.

The objectives of this invention are achieved when the emulsifying agent employed comprises a compound, hereinafter referred to as a carbamate of starch, in amounts ranging from 5 percent by weight of the furfuryl alcohol up to equal parts by weight thereof in the reaction mixture used to form the binder composition. At first the carbamate of starch is considered to be insoluble in aqueous medium but when heated up to reaction temperature the molecule is rearranged and becomes soluble in the aqueous medium where it functions as the emulsifying agent and subsequently it appears to react with the furfuryl alcohol to form a part of the binder composition whereby the solids deposited on the glass fibers is increased and the weathering of the binder on the glass fiber surfaces is also improved. When the carbamate of starch is present in amounts greater than the amount of furfuryl alcohol, the binder composition appears to film over the fibers undesirably to reduce the porosity of the web. This characteristic is often referred to in the trade as "duck webbing" and is to be avoided in the manufacture of a porous structure of bonded glass or mineral fibers.

From the theoretical standpoint, it is difficult to set forth the conditions by which the improvement is secured. However, in actual practice, it is found that the carbamate of starch as a component with the furfuryl alcohol and acidic catalyst in the aqueous medium permits of a more controlled and stable reaction and of the use of compositions having a higher concentration of furfuryl alcohol in natural or resinous state than it has heretofore been possible to secure. In addition, the carbamate of starch permits polymerization of the furfuryl alcohol at elevated temperature in the presence of an acidic catalyst to be extended as long as one hour or more without causing instability or precipitation even when the furfuryl alcohol is present in such higher concentrations and catalyst is present in equivalent proportions. This is to be compared to the maximum of about 15 minutes reaction permitted by prior processes. This permits the reaction to be better controlled for the production of a condensation product in the form of a polymer having more uniform molecular distribution. It also permits the desirable build-up of considerably larger molecules which, because of their size, are less soluble, less volatile and not as subject to deterioration under atmospheric conditions as is characteristic of furfuryl alcohol binders of the type heretofore produced.

The carbamate of starch comprises a carbohydrate in the form of a starch or glucoside base reacted with urea in a manner to substitute the urea for a hydroxy group with the elimination of water. Representative of carbamates of starch which may be used is a compound known as glucosan monocarbamate having a melting point of about 160° C. and represented by the general formula

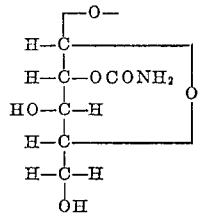

The corresponding dicarbamate may be used having the general formula

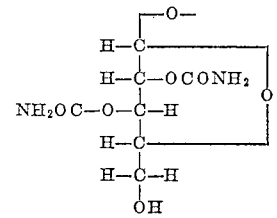

With the carbamate of starch present as an ingredient in the reaction mixture, the furfuryl alcohol concentration may range up to 30–35 percent by weight with unlimited dilution in water being possible after the reaction to provide the desired concentration of the resinous material in the binder composition applied to the glass fiber surfaces. The mixture of unpolymerized furfuryl alcohol dissolved in water in the desired proportion with the acidic catalyst and carbamate of starch may be heated to any suitable reaction temperature for a time sufficient to secure the degree of polymerization required. It is preferred to maintain the reaction temperature below 100° C. in order to permit polymerization in an open kettle or pressureless vats. The optimum temperature for reaction lies within the range of 90–98° C.

The presence of the carbamate of starch appears to keep the reaction under control so that one portion is not rapidly advanced as compared to other portions in a manner to produce premature instability and precipitation which has characterized reactions of the type heretofore secured. In fact, reaction in the presence of carbamate of starch appears to take place slowly and steadily to the end that the furfuryl alcohol is uniformly polymerized to molecules which are larger than have heretofore been used and which are thereby less volatile and less soluble when cured on the glass fiber surfaces and more stable under conditions of use. The carbamate of starch, which becomes soluble during reaction, forms a part of the binder composition which is reacted to insolubility on the glass fiber surfaces and as a result the amount of binder is increased and its permanence in position of use is also improved.

Application of the binder composition may be made to webs formed of discontinuous glass fibers laid down upon a collecting surface or onto bats of discontinuous glass fibers in haphazard arrangement and felted upon a collecting surface. Instead, application may be made to a web or bat formed of continuous fibers woven together into a textile or else deposited in the form of a mat, as upon a collecting wall moving at a slower speed than the rate at which the fibers, filaments or strands are fed whereby the fibers are deposited in swirl pattern on the collecting surface. In the alternative, suitable webs or bats may be formed by combinations of continuous and discontinuous fibers separately or simultaneously deposited to provide various combinations.

However formed, the web or bat may be advanced through a dip tank containing the binder composition followed by passage over draining tanks to remove excess but it is preferred to flood the web or bat with the binder composition while it is passing over the drainage tank wherein excess which flows from the fabric may be collected. After applying the binder composition, it is advisable to advance the fibrous structure over a suction box where excess binder composition may be removed to insure the desired degree of porosity and then the web or bat is advanced through a baking oven which may be heated to a temperature of about 300–700° F. and for a time sufficient to react the ingredients to a cured stage. About 4–5 minutes will be sufficient at 300–400° F. while ½–1 minute will be sufficient at a temperature of 550–600° F.

Typical formulations for binder compositions embodying features of this invention will hereinafter be set forth by way of illustration, but not by way of limitation.

*Example 1*

12 pounds furfuryl alcohol
6 pounds glucosan monocarbamate
500 cc. 1.84 specific gravity sulphuric acid
Water in amounts to make up 130 gallons.

*Example 2*

18 pounds furfuryl alcohol
1 pound carbamate of starch
60 pounds water
½ pound ferric chloride.

*Example 3*

20 pounds furfuryl alcohol
18 pounds glucosan dicarbamate
½ pound ferric chloride
½ pound ammonium chloride.

In preparing the binder composition from the materials set forth in the above examples and in other compositions similar thereto, the carbamate of starch is dispersed in about ¾ the total amount of water under agitation. Thereafter the furfuryl alcohol and acid are dissolved in the water and the mixture heated to 180–200° F. for about one hour. The remainder of water is then added for proper dilution. The order in which the materials are added is not critical and the length of cook for reaction may be more or less than the time specified, depending upon the degree of polymerization desired and the tendency for the polymerized resinous material to introduce instability into the reaction mixture.

The composition formed in Example 1 may be applied to 15 mil mat formed of continuous fibers which have previously been sized with a gelatin starch composition. After the binder composition has been applied, the mat is caused to travel over a suction box and then passed through an oven maintained at a temperature of about 550–600° F. for a time ranging from ½–1 minute. The amount of binder which is deposited and cured on the glass fibers provides for an ignition loss ranging from 6–8 percent by weight. Depending upon the amount removed at the suction box, binder may be applied to secure ignition losses as high as 12–15 percent by weight.

When tested under 48 hours of accelerated weathering, mat bonded in accordance with this invention having an ignition loss of about 10 percent retains sufficient binder to give it an ignition loss of about 5 percent by weight. This should be compared with mat bonded with a furfuryl alcohol binder composition of the type which has heretofore been produced where the binder which provides for an ignition loss of 12.2 percent when originally applied has an ignition loss of 2.5 percent after a similar weathering test for 48 hours. It will be apparent from these tests that only 50 percent of the binder prepared in accordance with this invention is eliminated in an accelerated weathering test whereas over 80 percent of a binder of the type which has heretofore been prepared is eliminated under similar conditions.

It will be apparent from this description that I have provided a new and improved binder composition for production of glass fiber bonded mat having the characteristics of greater stability, greater flexibility and strength with a less amount of brashiness than has heretofore been secured in bonded structures of similar type.

It will be understood that changes may be made in the ratio of materials and their method of treatment within the limitations prescribed and including their application and treatment onto the glass fiber structure in the preparation of bonded mat without departing from the spirit of the invention, especially as defined in the following claims.

I claim:

1. As an article of manufacture, a mass of mineral wool fibers bonded into a porous structure with a polymerizate of furfuryl alcohol and carbamate of starch.

2. As an article of manufacture, a mass of mineral wool fibers bonded into a porous mass with a polymerizate of furfuryl alcohol and carbamate of starch in the ratio of 5 percent by weight to equal parts by weight carbamate of starch based upon the amount of furfuryl alcohol.

3. An article of manufacture comprising glass fibers and a bonding agent securing the fibers one to another in a porous mass comprising a polymerized furfuryl alcohol and carbamate of starch.

4. An article of manufacture comprising glass fibers and a bonding agent securing the fibers one to another in a porous mass comprising a polymerized furfuryl alcohol and a carbamate of starch present in the ratio of 5 percent by weight to equal parts by weight carbamate of starch based on the amount of furfuryl alcohol.

5. An article of manufacture as claimed in claim 3 in which the carbamate of starch comprises glucosan monocarbamate.

6. In the method of producing a porous bonded mass of glass fibers, the steps of treating the glass fibers with a bonding agent comprising a polymerized furfuryl alcohol and carbamate of starch present in the ratio of 5 parts by weight to equal parts of starch based on the amount of furfuryl alcohol and heating the mass to a temperature within the range of 300–700° F. for a time sufficient to advance the furfuryl alcohol and carbamate of starch to an infusible and insoluble stage in situ on the glass fiber surfaces.

7. A binder composition for glass fibers comprising furfuryl alcohol, carbamate of starch and an acidic catalyst for polymerization of the furfuryl alcohol in aqueous medium.

8. A binder composition for glass fibers comprising an aqueous medium containing furfuryl alcohol and carbamate of starch present in the ratio of 5 parts by weight to equal parts by weight carbamate of starch based upon the weight of furfuryl alcohol and 1–5 percent by weight of an acidic catalyst for polymerization of the furfuryl alcohol at a temperature below 100° C.

LOUIS A. KOVREG.

REFERENCES CITED

The following references are of record in the file of this patent:

UNITED STATES PATENTS

| Number | Name | Date |
|---|---|---|
| 2,538,903 | Gaver | Jan. 23, 1951 |